April 28, 1953
J. J. POWERS
2,636,717
UTILITY TRUCK BODY
Filed Nov. 23, 1951
2 SHEETS—SHEET 1
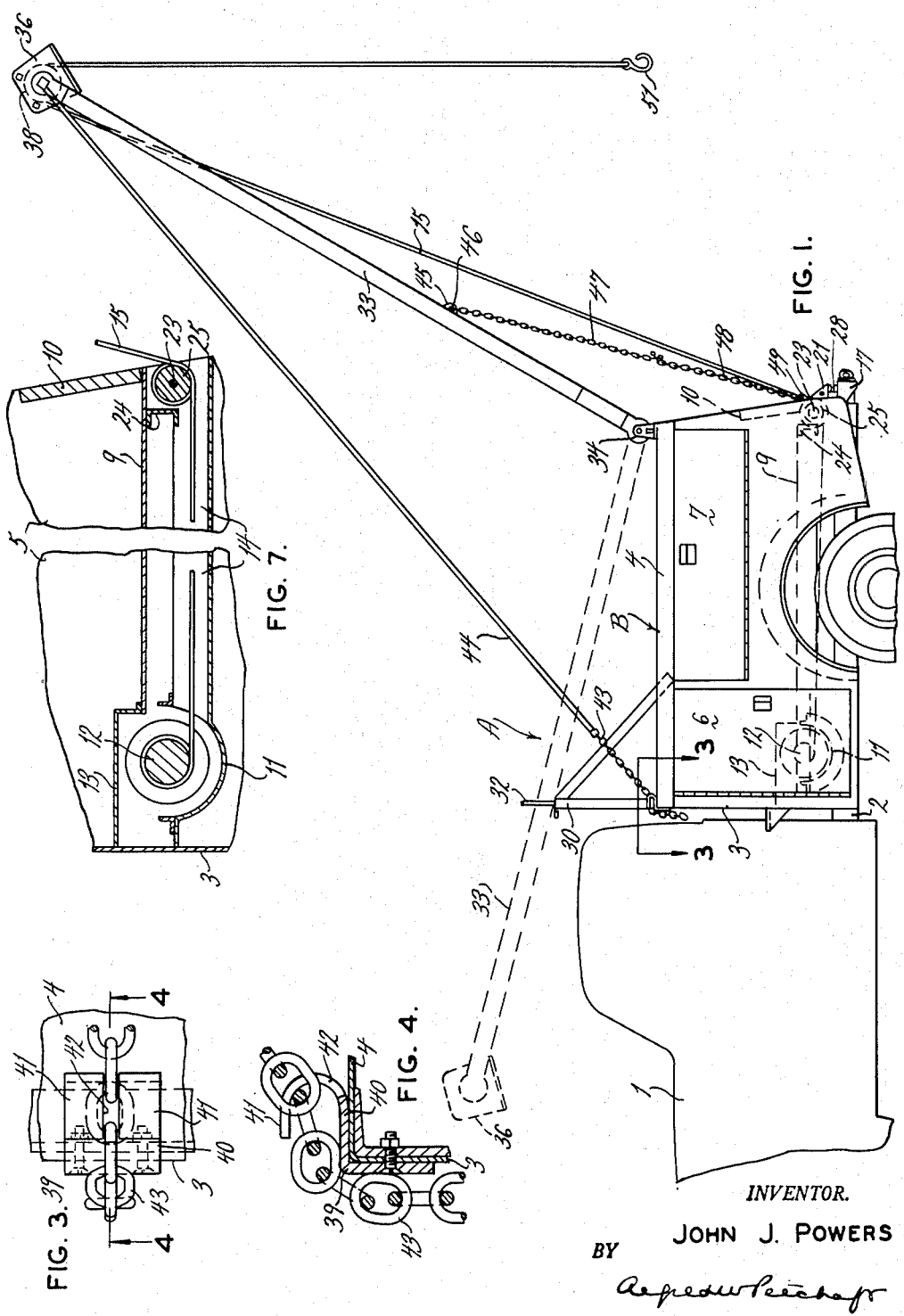
INVENTOR.
JOHN J. POWERS
BY
ATTORNEY April 28, 1953          J. J. POWERS          2,636,717
UTILITY TRUCK BODY
Filed Nov. 23, 1951          2 SHEETS—SHEET 2
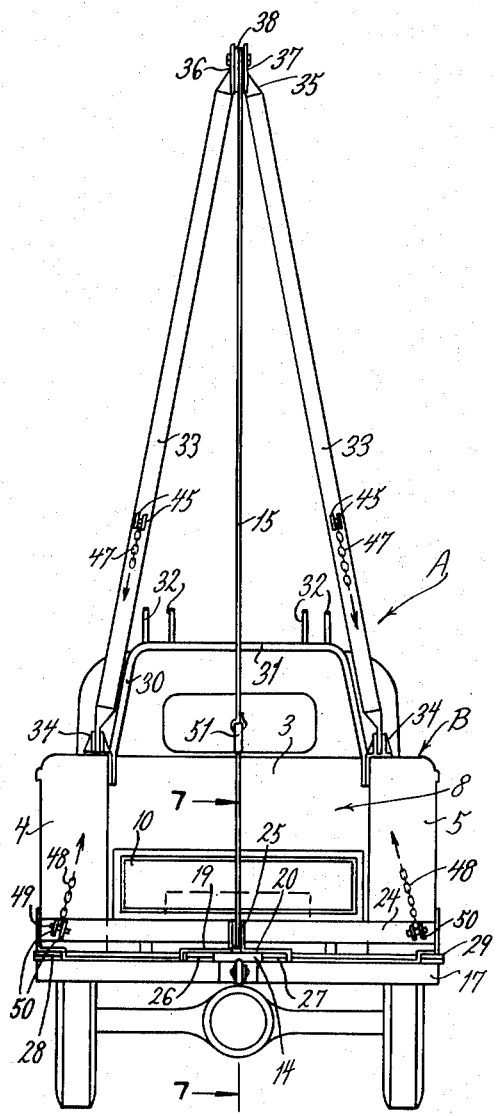
INVENTOR.
JOHN J. POWERS
BY
ATTORNEY Patented Apr. 28, 1953

2,636,717

UNITED STATES PATENT OFFICE 2,636,717

UTILITY TRUCK BODY

John J. Powers, University City, Mo.

Application November 23, 1951, Serial No. 257,805

2 Claims. (Cl. 254—139.1)

This invention relates in general to certain new and useful improvements in utility vehicles and, more particularly, to a utility truck-body suitable for general all-purpose field work and outlying and remotely located public utility systems, such as small rural electric distribution companies and the like.

In large metropolitan areas, the public utility systems are highly developed and relatively compact, so that various different types of maintenance crews can be constantly employed for a variety of specialized or departmentalized tasks and duties. In such public utility systems, it is not only convenient, but highly expedient, to maintain transformer repair crews, new-line installation crews, household maintenance and repair crews, and many different kinds of special maintenance groups, each group or crew being equipped with its own special type of vehicle or truck, carrying tools and equipment suitable to the particular type of tasks carried out by such crew. This highly complicated maintenance organization is not at all feasible or economical for small utility systems, such as those which are situated throughout the rural areas of the country. Even in large, highly integrated public utility systems there frequently are remotely located areas to which it is not economically desirable to send highly specialized maintenance crews, with the result that it is necessary to maintain a small all-purpose maintenance crew in such area. In order to equip such crews, it is desirable to provide a work-vehicle which is equipped with a derrick and more or less universally adaptable winch, together with necessary tool space and working space on the truck floor, so that the unit will lend itself readily to all types and conditions of maintenance work ordinarily encountered in the field.

It is, therefore, the primary object of the present invention to provide a vehicle having an all-purpose or general utility body uniquely suitable for meeting and handling all types of maintenance jobs ordinarily encountered in the field.

It is another object of the present invention to provide a vehicle body of the type stated which is equipped with a derrick, winch, and other similar equipment suitable for utility maintenance operations.

It is also an object of the present invention to provide a truck-body which is equipped with a simple, and yet sturdy, type of derrick capable of being swung from inoperative position to operative position in a simple, convenient, and speedy manner.

It is an additional object of the present invention to provide a truck-body having a derrick and winch so arranged that the floor of the truck will, at all times, be clear and available as working space and will not subject the workman to the hazard of becoming entangled in the winch cable or in the winch mechanism itself.

It is a further object of the present invention to provide a vehicle body of the type stated which is rugged, durable, and relatively inexpensive, while, at the same time, being readily adaptable to all-purpose utility maintenance work.

With the above and other objects in view, my invention resides in the novel features of form, construction, arrangement, and combination of parts presently described and pointed out in the claims.

In the accompanying drawings (two sheets):

Figure 1 is a fragmentary side elevational view of a derrick truck constructed in accordance with and embodying the present invention;

Figure 2 is a rear end elevational view of the derrick truck;

Figure 3 is a fragmentary sectional view taken along line 3—3 of Figure 1;

Figure 4 is a fragmentary sectional view taken along line 4—4 of Figure 3;

Figure 5 is a fragmentary diagrammatic top plan view of the rear end of the truck-body, illustrating the various different ways in which the winch cable may be employed in actual practice;

Figure 6 is a fragmentary side elevational view of the rear corner of the truck-body, showing in more detail the construction of the winch cable guiding pulleys; and Figure 7 is a fragmentary sectional view taken along line 7—7 of Figure 2.

Referring now in more detail and by reference characters to the drawings, which illustrate a preferred embodiment of the present invention, A generally designates a truck having a cab-and-engine unit 1 conventionally mounted upon a rearwardly extending chassis 2. It will be understood that the cab-and-engine unit 1 and chassis 2 are of any conventional type or design and, therefore, need not be specifically described or discussed herein. Rigidly mounted upon the chassis 2 is a truck-body B comprising a forward vertical transverse end wall 3 and rearwardly extending double-walled compartmentalized side panels 4, 5 each being suitably and conventionally provided in their outwardly presented faces with swingably mounted doors 6, 7, for affording ready access to the compartmentalized interiors of the side panels 4, 5. As will be seen by reference to Figure 2, the side panels 4, 5, extend along the longitudinal margins of the truck-body 2 in spaced parallel relation, thereby providing an intermediate working space 8 having a flat horizontal floor 9. Hinged to, and extending transversely across, the rear margin of the floor 9, between the side panels 4, 5, is a tailgate 10, serving as an end closure for the otherwise open rear end of the truck-body B.

At its forward end, the floor 9 is cut away and provided upon its outer face with an arcuately depending or underslung well 11, sized for accommodating substantially a conventional cable winch 12. Removably secured in cover-forming relation over the well 11, for enclosing and completely concealing and protecting the winch 12, is a rectilinear box-like cover 13. Welded or otherwise suitably secured upon the under face of the floor 9 and extending longitudinally rearwardly along the center-line thereof is a tunnel-like channel 14 opening at its forward end into the well 11 and at its rearward end upon the back end of the truck-body B just below the tailgate 10 for housing and enclosing the rearwardly extending run of a winch cable 15.

The rear end of the chassis 2 is provided with horizontally projecting arms 16 for supporting a transversely extending channel-shaped bumper-bar 17 having an upwardly presented broad flat top face 18, the central portion of which lies directly beneath the rearward opening of the channel 14. Welded upon the upper face 18 of the bumper-bar 17 and upon the rearward face of the truck body B, directly below the tailgate 10, is a pair of oppositely presented L-shaped plates 19, 20, having spaced parallel vertical leg-plates 21 of somewhat triangular shape for supporting a removable pin 22. Suitably journaled upon a horizontally disposed pintle 23 within the rear cross-beam 24 of the truck-body 2, just above the rearward opening of the channel 14, is a vertical pulley 25 around which the winch cable 15 may be trained upwardly, for purposes presently more fully appearing. Similarly mounted on the opposite sides of the channel 14, between the plates 19, 20, and the upper plate 18 of the bumper-bar 17, are horizontally disposed central pulleys 26, 27, and corner pulleys 28, 29, which are positioned outwardly by a sufficient distance so as to clear the outwardly presented vertical surfaces of the truck-body B, all as best seen in Figure 6. The winch cable 15 may accordingly be traineed directly rearwardly between the pulleys 26, 27, or angularly to one side or the other, or completely crosswise and angularly around either one of the corner pulleys 28, 29, to be directed toward the front, all as schematically shown in dotted lines in Figure 5. These various positions of the winch cable 15 may be quickly achieved by removing the pin 22 and pulling the winch cable out in the desired direction. When, however, the winch cable 15 is directed upwardly, as shown in Figure 6, the pin 22, in co-operation with the spaced parallel leg-plates 21, will serve to prevent the winch cable 15 from unauthorizedly slipping off the pulley 25.

It should be stated, in this connection, that the winch 12 is driven and controlled by a conventional power take-off assembly, operatively connected, through suitable manual controls, to the engine or motor of the truck A. Inasmuch as this driving arrangement is conventional, it has not been illustrated, shown, or described herein.

Welded to, and extending upwardly from, the upper transverse margin of the front wall 3 is an inverted U-shaped support frame 30 having a horizontal cross-bar 31 positioned at a level substantially above the roof of the truck-body A and provided, at suitably spaced intervals, with upwardly extending pairs of bracket-forming pins 32 for embracingly receiving tubular derrick-legs 33, which are hingedly mounted at their rearward ends in hinge-fittings 34 welded upon the rearward upper corners of the side panels 4, 5. The derrick-legs 33 extend convergingly toward each other and are rigidly secured together by a top-fitting 35 having spaced parallel legs 36, 37, for operatively supporting a pulley 38. When the derrick-legs 33 are not in use, they will extend from the hinge-fitting 34 angularly upwardly and forwardly between the bracket pins 32, as shown in dotted lines in Figure 1.

Welded, bolted, or otherwise firmly secured upon the upper forward corners of the side panels 4, 5, are guy-retainer fittings 39 integrally including a horizontal plate element 40, the rearward margin of which is curved upwardly upon itself in the formation of two transversely spaced hooks 41 having a space or slot 42 therebetween for adjustably receiving and retaining the links of a tail-chain 43, which is, in turn, rigidly fastened at one end to a guy-cable 44 permanently secured, at its opposite end, to the top-fitting 35. As will be seen by reference to Figures 3 and 4, any one of the links of the chain 43 may be engaged within the slot 42, so that the next lower link will be retentively caught crosswise against and within the hooks 41. By this means, the overall effective length of the guy-cables 44 may be adjusted so that the rearwardly inclined angular position of the derrick-legs 33 can be adjusted within predetermined limits when disposed in upright or operative position, as shown in full lines in Figure 1.

The derrick-legs 33 are each provided with a small pair of spaced parallel ears 45 for supporting transverse pins 46, extending through the uppermost link of a guy-chain 47 which extends angularly downwardly, when the derrick-legs 33 are in upright position, for hooked engagement with the upper end of a guy-chain 48, similarly fastened at its lower end to a pin 49 mounted between spaced parallel pairs of ears 50 welded upon the outer or corner ends of the rear beam 24. Each guy-chain 47 can be connected with its corresponding guy-chain 48 by hooking at any one of several selected links, so that the combined links of the guy-chains 47, 48, can be suitably adjusted for the selected angular position of the derrick-legs 33. It will, furthermore, be noted, by reference to Figures 1 and 2, that when the derrick-legs 33 are in upright position, the winch cable 15 may be trained angularly upwardly over the pulley 38 and swung dependingly therefrom, so that its lower end, which is equipped with a conventional load-hook 51, may be lowered for attachment to any suitable load. Similarly, when the derrick is swung down into inoperative position, the winch cable 15 may, as previously pointed out, be utilized in various angular positions within the horizontal plane, so to speak, for pulling out stumps, or any similar types of work, or may be even swung toward the front and attached to some tree trunk or permanently secured heavy object, such as a bridge abutment or the like, for permitting the truck, through the agency of its winch 12, to pull itself out of the mud or out of a soft roadside embankment whenever necessary.

The derrick-legs 33 may be swung from inoperative to operative position very quickly and may conveniently be set up to various desired angles by a single workman, and, when set up in operative position, will be strongly and rigidly held in such operative position by the link adjustable guy-cable 44 and the correspondingly adjustable sets of guy-chains 47, 48. Furthermore, the winch cable 15 may be used in conjunction with the winch 12 while a workman is standing or working upon the floor 9 of the truck-body B without danger of catching his feet or catching tools and other parts which may be laying upon the floor 9.

It should be understood that changes and modifications in the form, construction, arrangement, and combination of the several parts of the utility truck-body may be made and substituted for those herein shown and described without departing from the nature and principle of my invention.

Having thus described my invention, what I claim and desire to secure by Letters Patents is—

1. In a utility truck, a floor, a transverse forward end wall and spaced parallel side panels arranged to form a truck-body having a substantially open top and rear end, a hinge fitting rigidly mounted on each side panel adjacent the rear end and in upwardly spaced relation to the floor, a derrick leg hingedly mounted at one end in each hinge fitting, said derrick legs converging toward each other and being connected at their other ends in the provision of a two-legged V-shaped derrick frame, a relatively long guy-member attached to each derrick leg, means on the truck-body for releasably engaging each of said long guy-members, a short guy-member secured to each derrick leg, means for releasably engaging the short guy-members in the provision of a two-legged derrick stabilized by four downwardly and outwardly diverging guy-members, a depressed well formed in the floor adjacent the forward wall, a winch operatively mounted in the well, a longitudinally extending tunnel formed on the under side of the floor opening at its forward end into the well and on its rearward end upon the rear end of the truck-body, and a derrick-cable wound on the winch and extending rearwardly through the tunnel.

2. In a utility truck, a floor, a transverse forward end wall and spaced parallel side panels arranged to form a truck-body having a substantially open top and rear end, a hinge fitting rigidly mounted on each side panel adjacent the rear end and in upwardly spaced relation to the floor, a derrick leg hingedly mounted at one end in each hinge fitting, said derrick legs converging toward each other and being connected at their other ends in the provision of a two-legged V-shaped derrick frame, a relatively long guy-member attached to each derrick leg, means on the truck-body for releasably engaging each of said long guy-members, a short guy-member secured to each derrick leg, means for releasably engaging the short guy-members in the provision of a two-legged derrick stabilized by four downwardly and outwardly diverging guy-members, a depressed well formed in the floor adjacent the forward wall, a winch operatively mounted in the well, a longitudinally extending tunnel formed on the under side of the floor opening at its forward end into the well and on its rearward end upon the rear end of the truck-body, a first pulley rotatably mounted at the rear end of the truck-body in alignment with the tunnel, a second pulley operatively mounted on the upper end of the derrick, and a derrick-cable wound on the winch and extending rearwardly through the tunnel, said cable extending around said first and second pulleys and thence downwardly for securement to a load.

JOHN J. POWERS.

References Cited in the file of this patent

UNITED STATES PATENTS

| Number | Name | Date |
| --- | --- | --- |
| 1,284,812 | Strait | Nov. 12, 1918 |
| 1,476,627 | Luebke et al. | Dec. 4, 1923 |
| 1,892,411 | Segimon | Dec. 27, 1932 |
| 2,016,130 | Wren | Oct. 1, 1935 |
| 2,257,873 | Troche | Oct. 7, 1941 |
| 2,593,764 | Kaunitz | Apr. 22, 1952 |

FOREIGN PATENTS

| Number | Country | Date |
| --- | --- | --- |
| 195,360 | Great Britain | Oct. 11, 1923 |